US009690332B2

(12) United States Patent
Liu et al.

(10) Patent No.: US 9,690,332 B2
(45) Date of Patent: Jun. 27, 2017

(54) ELECTRONIC DEVICE, COMBINING DEVICE, AND DETACHING METHOD

(71) Applicant: Kabushiki Kaisha Toshiba, Minato-ku, Tokyo (JP)

(72) Inventors: Stan Liu, Taipei (TW); Vic Lin, Taipei (TW); Brad Chiu, Taipei (TW); San Huang, Taipei (TW)

(73) Assignee: Kabushiki Kaisha Toshiba, Tokyo (JP)

( * ) Notice: Subject to any disclaimer, the term of this patent is extended or adjusted under 35 U.S.C. 154(b) by 383 days.

(21) Appl. No.: 14/316,102

(22) Filed: Jun. 26, 2014

(65) Prior Publication Data

US 2015/0098182 A1 Apr. 9, 2015

Related U.S. Application Data

(60) Provisional application No. 61/888,948, filed on Oct. 9, 2013.

(51) Int. Cl.
*G06F 1/16* (2006.01)

(52) U.S. Cl.
CPC .......... *G06F 1/1681* (2013.01); *G06F 1/1632* (2013.01); *G06F 1/1654* (2013.01); *G06F 1/1669* (2013.01); *G06F 1/1679* (2013.01)

(58) Field of Classification Search
CPC .... G06F 1/1632; G06F 1/1654; G06F 1/1669; G06F 1/1679; G06F 1/1681
USPC .......................... 361/679.17, 679.29, 679.58
See application file for complete search history.

(56) References Cited

U.S. PATENT DOCUMENTS

| | | | | |
|---|---|---|---|---|
| 5,144,290 A | * | 9/1992 | Honda | G06F 1/1616 16/306 |
| 5,796,576 A | * | 8/1998 | Kim | G06F 1/1616 16/259 |
| 5,805,415 A | * | 9/1998 | Tran | G06F 1/1601 248/918 |
| 5,949,565 A | * | 9/1999 | Ishida | G06F 1/1616 361/679.28 |
| 6,006,243 A | * | 12/1999 | Karidis | G06F 1/1616 361/679.27 |
| 6,317,315 B1 | * | 11/2001 | Lee | G06F 1/1601 16/254 |

(Continued)

FOREIGN PATENT DOCUMENTS

| | | |
|---|---|---|
| JP | 2001-331238 A | 11/2001 |
| JP | 2009-237497 A | 10/2009 |
| JP | 2011-187043 A | 9/2011 |

*Primary Examiner* — Adrian S Wilson
(74) *Attorney, Agent, or Firm* — Knobbe, Martens Olson & Bear LLP

(57) ABSTRACT

According to one embodiment, an electronic device includes a first part, a second part, a third part, and a combining portion. The second part is connected with the first part and configured to move between a first position and a second position. The combining portion is configured to combine the third part with the second part when the second part is positioned within a combining interval defined within an interval between the first position and the second position, and to separate the third part from the second part when the second part is position at a third position defined at the second position or defined at a position between the combining interval and the second position.

14 Claims, 14 Drawing Sheets

(56) References Cited

U.S. PATENT DOCUMENTS

| | | | |
|---|---|---|---|
| 6,512,670 B1 * | 1/2003 | Boehme | G06F 1/1616 312/223.2 |
| 6,590,547 B2 * | 7/2003 | Moriconi | G06F 1/1616 248/917 |
| 6,778,382 B2 * | 8/2004 | Yim | G06F 1/1616 345/82 |
| 6,944,012 B2 * | 9/2005 | Doczy | G06F 1/1626 312/208.1 |
| 7,265,739 B2 | 9/2007 | Yim | |
| 7,447,005 B2 * | 11/2008 | Han | G06F 1/1601 248/918 |
| 7,541,907 B2 * | 6/2009 | Wang | G06F 1/1632 335/214 |
| 7,576,982 B2 * | 8/2009 | Wang | G06F 1/162 345/204 |
| 7,933,118 B2 * | 4/2011 | Chiu | H05K 5/0247 361/679.4 |
| 8,300,389 B2 | 10/2012 | Kang et al. | |
| 8,498,100 B1 * | 7/2013 | Whitt, III | G06F 1/1618 361/679.17 |
| 8,531,827 B2 * | 9/2013 | Huang | G06F 1/1654 361/679.26 |
| 8,644,018 B2 * | 2/2014 | Hung | G06F 1/1632 16/302 |
| 9,013,868 B2 * | 4/2015 | Kuo | G06F 1/1632 361/679.43 |
| 9,047,049 B2 * | 6/2015 | Yang | G06F 1/1626 |
| 9,223,356 B2 * | 12/2015 | Chuang | G06F 1/1626 |
| 9,367,088 B2 * | 6/2016 | Chang | G06F 1/1632 |
| 9,398,707 B2 * | 7/2016 | Chang | H05K 5/0221 |
| 2001/0022719 A1 * | 9/2001 | Armitage | G06F 1/16 361/679.17 |
| 2004/0190234 A1 * | 9/2004 | Lin | G06F 1/162 361/679.28 |
| 2005/0111182 A1 * | 5/2005 | Lin | G06F 1/1632 361/679.41 |
| 2006/0006674 A1 * | 1/2006 | Kang | E05C 19/16 292/251.5 |
| 2006/0056140 A1 * | 3/2006 | Lev | E05C 19/163 361/679.27 |
| 2008/0024966 A1 * | 1/2008 | Huang | G06F 1/1626 361/679.06 |
| 2009/0141439 A1 * | 6/2009 | Moser | G06F 1/1616 361/679.29 |
| 2013/0044425 A1 * | 2/2013 | Lin | G06F 1/1669 361/679.43 |
| 2014/0098474 A1 * | 4/2014 | Bhowmik | G06F 1/1616 361/679.01 |
| 2015/0160700 A1 * | 6/2015 | Yang | G06F 1/1669 361/679.17 |
| 2015/0198980 A1 * | 7/2015 | Aoki | G06F 1/1616 361/679.17 |

\* cited by examiner

US 9,690,332 B2

ELECTRONIC DEVICE, COMBINING DEVICE, AND DETACHING METHOD

CROSS-REFERENCE TO RELATED APPLICATIONS

This application claims the benefit of U.S. Provisional Patent Application No. 61/888,948, filed on Oct. 9, 2013.

FIELD

Embodiments described herein relate generally to an electronic device, an combining device, and a detaching method.

BACKGROUND

There are some devices in which one part is detachable from the other part.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a first part, a second part, a third part, and a combining portion. The second part is connected with the first part and configured to move between a first position and a second position. The combining portion is configured to combine the third part with the second part when the second part is positioned within a combining interval defined within an interval between the first position and the second position, and to separate the third part from the second part when the second part is position at a third position defined at the second position or defined at a position between the combining interval and the second position.

Hereinafter, a first embodiment is described with reference to FIGS. 1 to 11. In the present specification, generally, the side close to a user is defined as the front, the distal side from the user is defined as the rear, the left side viewed from the user is defined as the left direction, the right side viewed from the user is defined as the right direction, the upper side viewed from the user is defined as the upward direction, and the lower side viewed from the user is defined as the downward direction. Furthermore, the constituent elements in the embodiments and the description of such elements may be expressed in a plurality of ways. Such elements and descriptions may be expressed in other ways not expressed in the following description. Moreover, the constituent elements and the descriptions not expressed in a plurality of ways may be expressed in a different way.

Figure 1:
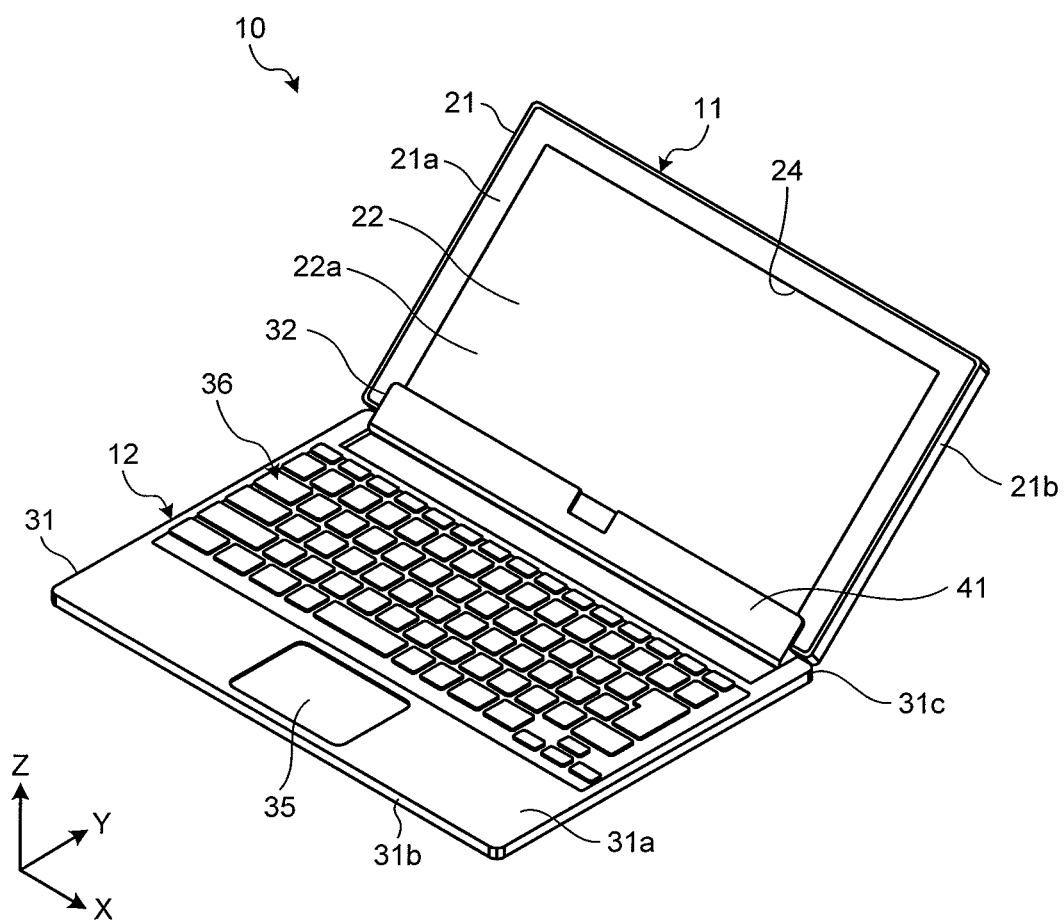
FIG. 1 is an exemplary perspective view illustrating a portable computer according to a first embodiment.
Figure 2:
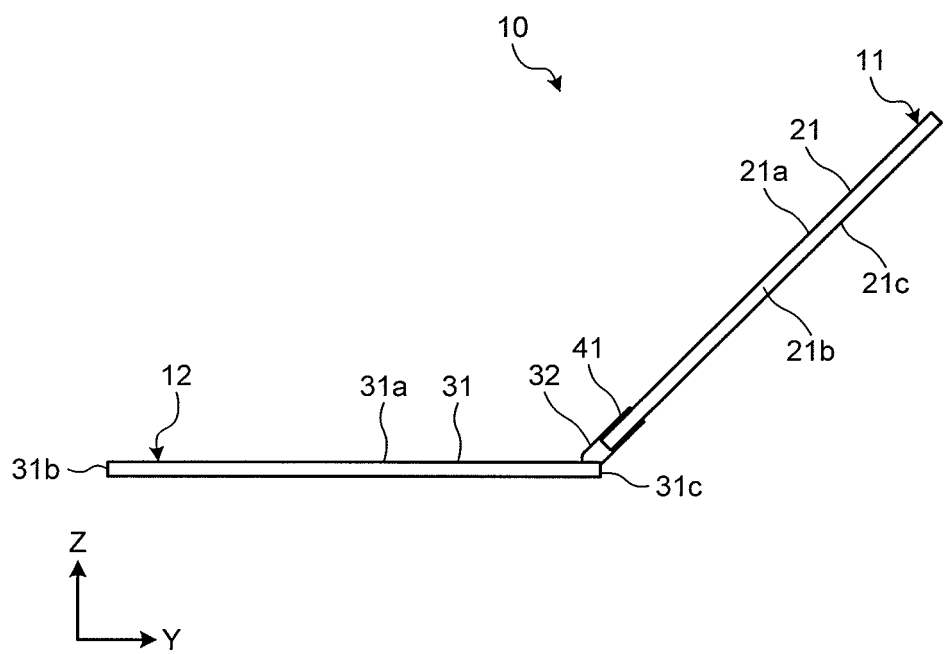
FIG. 2 is an exemplary side view illustrating the portable computer in the first embodiment.

FIG. 1 is a perspective view schematically illustrating a portable computer 10 according to a first embodiment. FIG. 2 is a side view schematically illustrating the portable computer 10. The portable computer 10 is one example of the electronic device and a combining device.

As illustrated in FIG. 1, the portable computer 10 comprises a tablet type device (hereinafter referred to as a tablet) 11 and a docker 12. The tablet 11 is one example of the third portion and a detachable portion, and can also be referred to as a slate type device, a device, a computer, a terminal, or an apparatus, for example. The docker 12 can also be referred to as a docking station, a stand, a supporting portion, an input device, an expansion device, a connection device, or a peripheral device, for example.

The tablet 11 is connected with the docker 12. The portable computer 10 comprising the tablet 11 connected with the docker 12 is used as a notebook personal computer. The tablet 11 is detachable from the docker 12. The tablet 11 detached from the docker 12 can be used stand-alone.

The tablet 11 comprises a housing 21 and a touch panel display (hereinafter referred to as a display) 22. The tablet 11 further comprises a variety of components such as a battery, a central processing unit (CPU), a read only memory (ROM), a random access memory (RAM), an antenna, various connectors, and a printed circuit board (PCB). The housing 21 can also be referred to as an outer shell, a housing portion, a protection portion, or a wall. The display 22 can also be referred to as a display device, a displaying portion, an output portion, a component, or a module.

The housing 21 accommodates the display 22 and the above-described variety of components. The housing 21, for example, is in a flat box shape formed of synthetic resin or metal such as magnesium alloy. As illustrated in FIG. 2, the housing 21 comprises an anterior surface 21a, four side faces 21b, and a back surface 21c. The back surface 21c is positioned on the opposite side of the anterior surface 21a. Each of the four side faces 21b connects between the anterior surface 21a and the back surface 21c. The four side faces 21b include a pair of long side faces and a pair of short side faces. Furthermore, between each of the adjoining side faces 21b, a corner portion is formed.

As illustrated in FIG. 1, the anterior surface 21a of the housing 21 is provided with a display opening 24. The display opening 24 exposes a screen 22a of the display 22. The display opening 24 may be covered with, for example, a transparent glass or acrylic sheet.

The display 22 is what is called a touch, screen that comprises a display device such as a liquid crystal display (LCD) and an organic electroluminescence (OEL) display, and a touch panel combined with the display device. The display 22 may be an in-cell touch panel. The display 22 is controlled by the above-described variety of components, for example, and displays images on the screen 22a. In the specification, the images include movies, still pictures, colors, and characters.

The display 22 detects the position of the screen 22a touched (a touch position) with a user's finger, a stylus pen, and others. Thus, the display 22 is a device to output images as well as an input device in the tablet 11.

The docker 12 comprises a base 31 and a docking portion 32. The base 31 is one example of the first portion, and can also be referred to as a stand, a support portion, an input device, an expansion device, or a rotating portion, for example. The docking portion 32 is one example of the second portion, and can also be referred to as a connecting portion, an attaching portion, a coupling portion, a combining portion, a fixing portion, a rotating portion, or a hinge, for example.

The base 31 is used for input and output of signals with the tablet 11, connection of a power source and external devices, and charging of the tablet 11, for example. The base 31 is heavier than the tablet 11. The weight of the base 31 may be equal to or less than that of the tablet 11. The docking portion 32 connects the tablet 11 with the docker 12. Thus, the tablet 11 is attached to the docking portion 32 to unite with the docker 12.

As illustrated in FIG. 1, an X axis, a Y axis, and a Z axis are defined in the specification. The X axis, the Y axis, and the Z axis are orthogonal to one another. The X axis is along the longitudinal direction (width) of the base 31. The Y axis is along the short direction (depth) of the base 31. The Z axis is along the height direction (thickness) of the base 31.

The base 31 comprises an upper face 31a, a front end portion 31b, and a rear end 31c. The base 31 further comprises a touch pad 35, a keyboard 36, and a variety of components such as a battery, various connectors, and a PCB. The touch pad 35 and the keyboard 36 are examples of an input module.

The touch pad 35 and the keyboard 36 are provided on the upper face 31a of the base 31, side by side. The touch pad 35 is positioned closer to the front end portion 31b than the keyboard 36. The keyboard 36 is positioned closer to the rear end 31c than the touch pad 35. The touch pad 35 is a pointing device and is further used for click operation. For example, the user depresses the touch pad 35 to perform the click operation.

Figure 3:
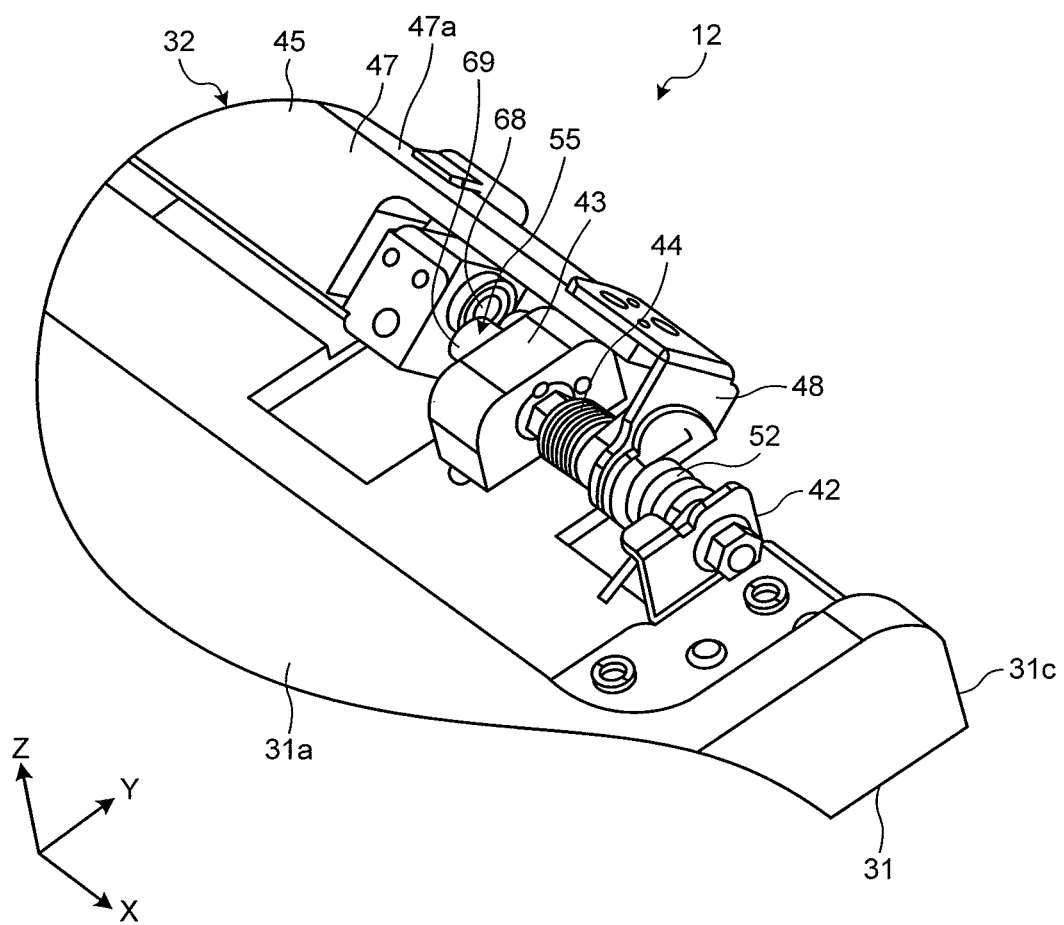
FIG. 3 is an exemplary perspective view illustrating a portion of the portable computer in the first embodiment.

FIG. 3 is a perspective view illustrating a part of the portable computer 10 around the rear end 31c of the base 31. As illustrated in FIGS. 1 and 3, the docking portion 32 is connected with the upper face 31a of the base 31 near the rear end 31c of the base 31. Thus, the docking portion 32 is positioned closer to the rear end 31c than the keyboard 36. The docking portion 32 may be attached to another place, for example, the rear end 31c of the base 31 and others.

The docking portion 32 comprises a cover 41, a first fixing piece 42, a second fixing piece 43, a rotating shaft 44, and a rotating portion 45. The first fixing piece 42, the second fixing piece 43, the rotating shaft 44, and the rotating portion 45 can also be referred to as a hinge portion, for example.

The cover 41 covers the first fixing piece 42, the second fixing piece 43, the rotating shaft 44, and the rotating portion 45. The cover 41 guides the tablet 11 to be attached to the docking portion 32. FIG. 3 illustrates a portion of the portable computer 10 without the cover 41.

The first fixing piece 42 and the second fixing piece 43 are fixed to the base 31 with screws, for example. The first and second fixing pieces 42 and 43 may be integrally formed with the base 31. The first and second fixing pieces 42 and 43 project from the upper face 31a of the base 31. The first fixing piece 42 and the second fixing piece 43 line along the X axis.

The rotating shaft 44 extends along the X axis. One end portion of the rotating shaft 44 is fixed to the first fixing piece 42. The other end portion of the rotating shaft 44 is fixed to the second fixing piece 43. The rotating shaft 44 may be attached to the first and second fixing pieces 42 and 43 to be rotatable.

The rotating portion 45 comprises a support portion 47 and an attaching piece 48. The support portion 47 extends along the X axis. The support portion 47 comprises a support face 47a. When the tablet 11 is attached to the docking portion 32, the support face 47a of the support portion 47 supports the side face 21b of the housing 21 of the tablet 11. The attaching piece 48 is positioned at the end portion of the support portion 47. The attaching piece 48 is attached to the rotating shaft 44 to be rotatable. Consequently, the rotating portion 45 can rotate around the rotating shaft 44.

The docking portion 32 comprising the rotating portion 45 is configured to rotate with respect to the base 31. In other words, the docking portion 32 is configured to move with respect to the base 31. It is noted that, the docking portion 32 may slide with respect to the base 31, for example.

The docking portion 32 rotates between zero degrees that is an angle at which the tablet 11 attached to the docking portion 32 overlaps the base 31 and 180 degrees at which the tablet 11 is in parallel with the base 31. The position in which the docking portion 32 is located at an angle of zero degrees with respect to the base 31 is one example of the first position. The position in which the docking portion 32 is located at an angle of 180 degrees with respect to the base 31 is one example of the second position. The first and second positions may be other positions.

Figure 4:
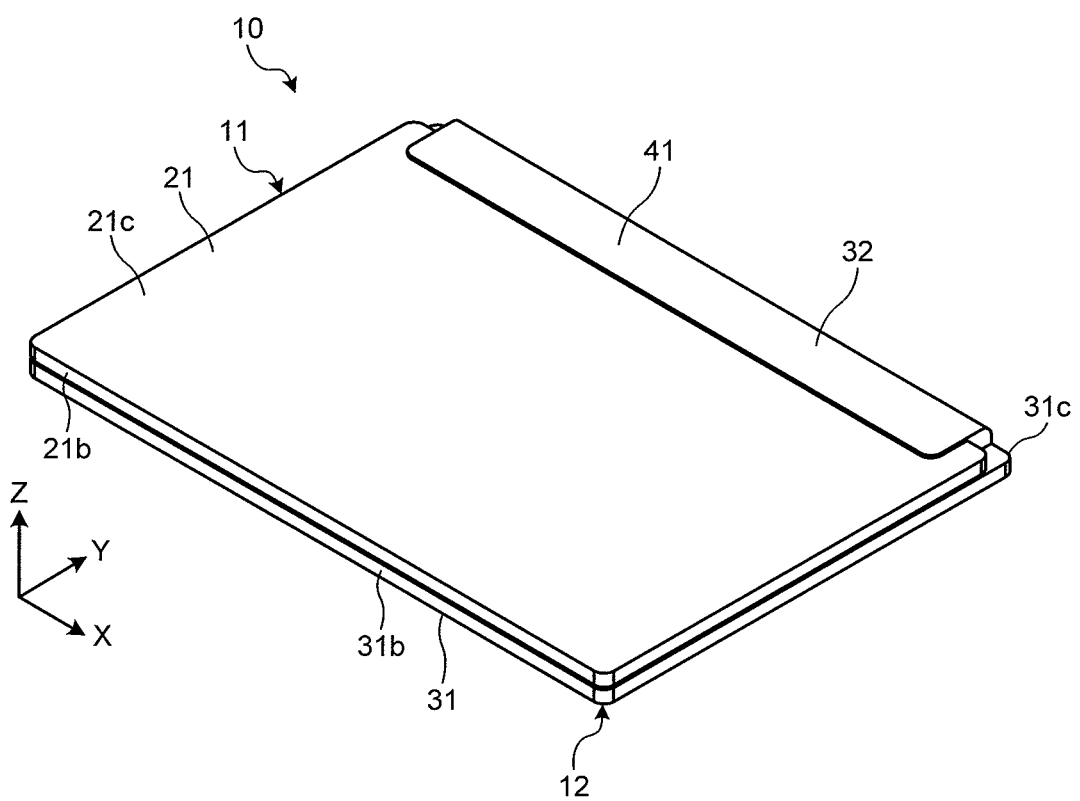
FIG. 4 is an exemplary perspective view illustrating the closed portable computer in the first embodiment.
Figure 5:
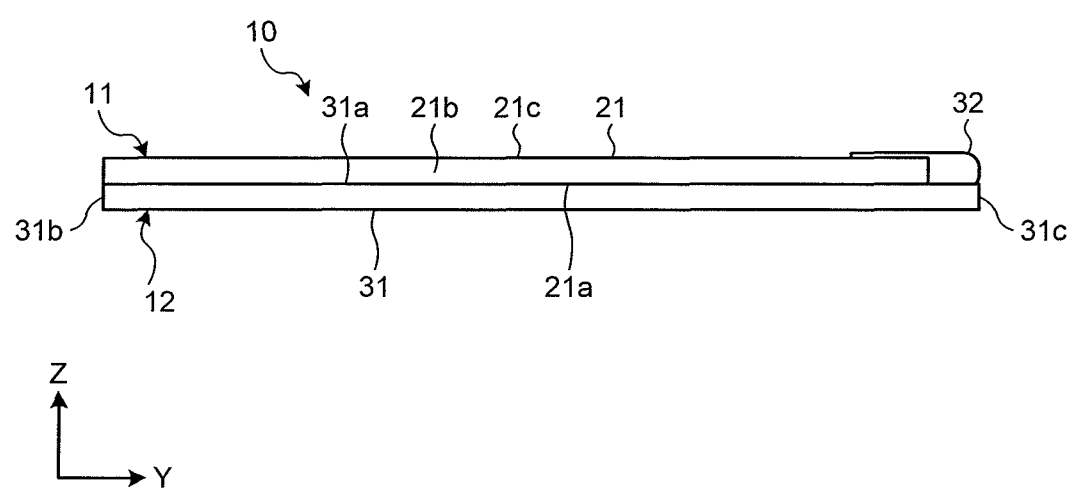
FIG. 5 is an exemplary side view illustrating the closed portable computer in the first embodiment.

FIG. 4 is a perspective view schematically illustrating the closed portable computer 10 in which the docking portion 32 is located at zero degrees. FIG. 5 is a side view schematically illustrating the closed portable computer 10. The docking portion 32 located at the position of zero degrees can also be referred to as being located at a closed position, for example.

Figure 6:
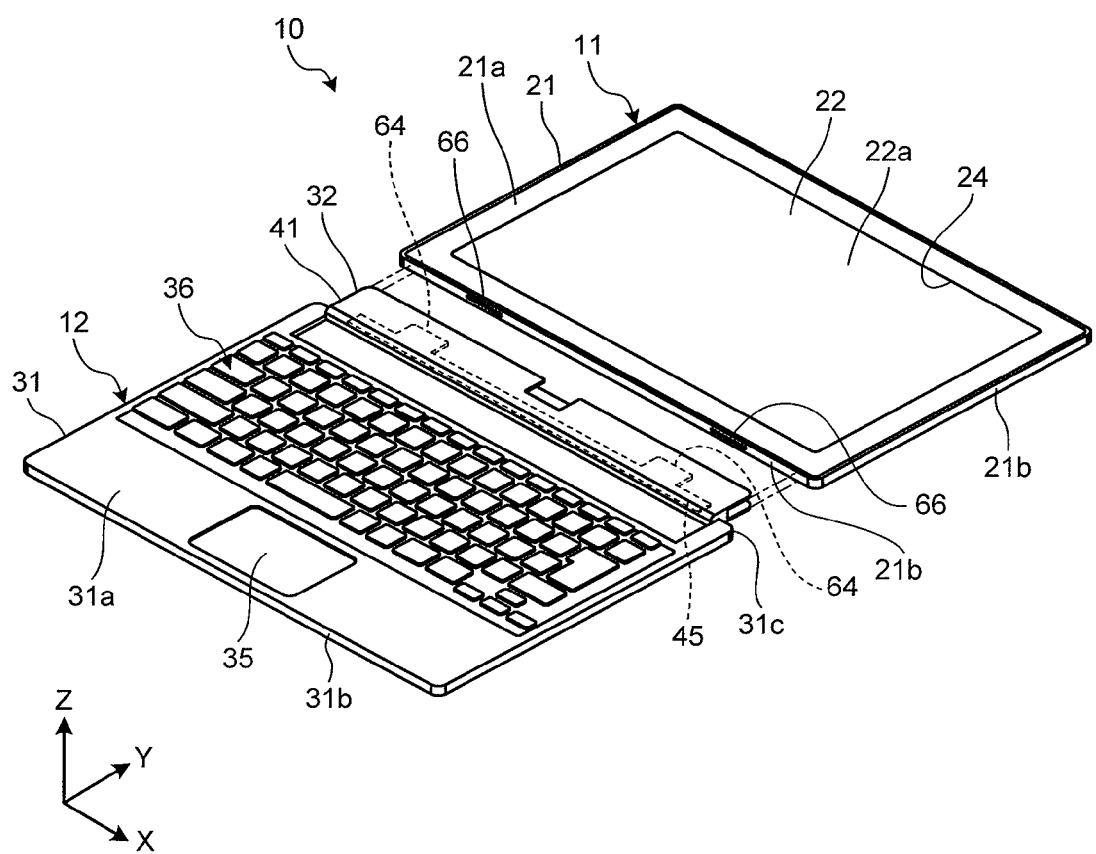
FIG. 6 is an exemplary perspective view illustrating the opened portable computer in the first embodiment.
Figure 7:
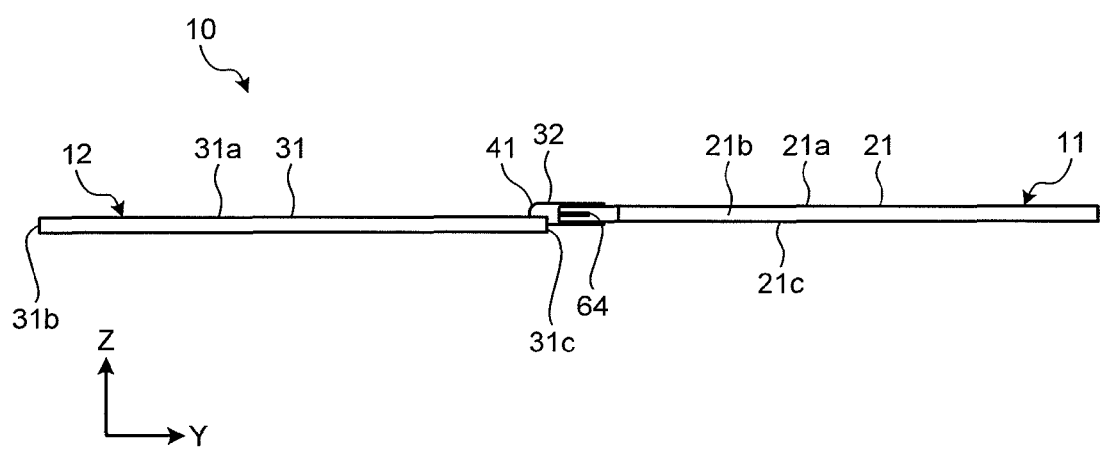
FIG. 7 is an exemplary side view illustrating the opened portable computer in the first embodiment.

FIG. 6 is a perspective view schematically illustrating the opened portable computer 10 in which the docking portion 32 is located at 180 degrees. FIG. 7 is a side view illustrating the opened portable computer 10. The docking portion 32 located at the position of 180 degrees can also be referred to as being located at an opened position, for example.

Figure 8:
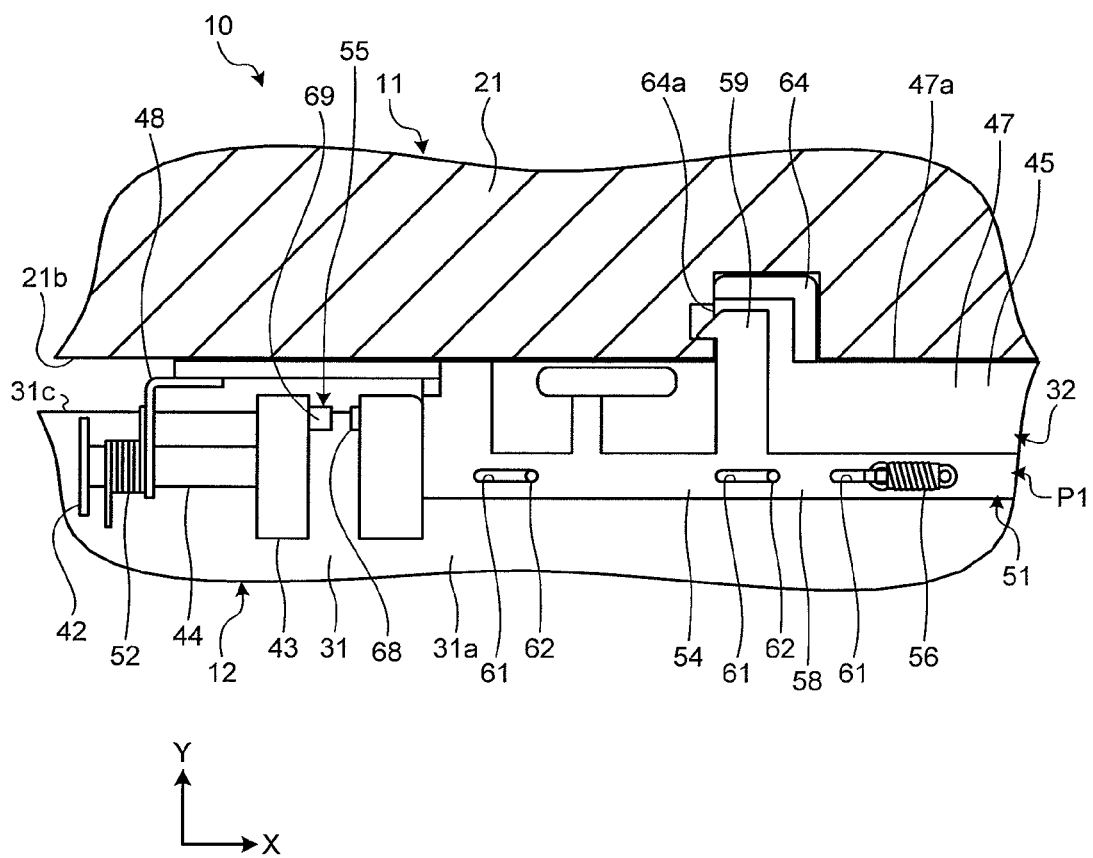
FIG. 8 is an exemplary plan view illustrating a portion of the portable computer in the first embodiment.

FIG. 8 is a plan view schematically illustrating a portion of the opened portable computer 10 without the cover 41. As illustrated in FIG. 8, the docking portion 32 further comprises a combining portion 51 and a first moving portion 52. The combining portion 51 can also be referred to as a coupling portion, an attaching portion, a fixing portion, an engaging portion, or a chuck portion, for example. The first moving portion 52 can also be referred to as a return portion, a rotating portion, a restoring portion, or a portion exerting a force, for example.

The combining portion 51 comprises a combining member 54, a second moving portion 55, and a third moving portion 56. The combining member 54 can also be referred to as a coupling portion, an attaching portion, a fixing portion, an engaging portion, a holding portion, or a chuck portion, for example. The second moving portion 55 can also be referred to as a shift portion, a pushing portion, a pulling portion, a slide portion, or a portion exerting a force, for example. The third moving portion 56 can also be referred to as a shift portion, a pushing portion, a pulling portion, a slide portion, a restoring portion, or a portion exerting a force, for example.

The combining member 54 comprises a slide portion 58 and a hook 59. The hook 59 can also be referred to as an engaging portion, a fixing portion, a holding portion, or a chuck portion, for example. The slide portion 58 and the hook 59 are integrally formed of metal, for example.

The slide portion 58 is formed in a plate-like shape extending along the X axis, and is attached to the support portion 47 of the rotating portion 45. The slide portion 58 is arranged to be orthogonal to the support face 47a of the support portion 47. The slide portion 58 may be positioned at another place of the support portion 47.

The slide portion 58 is provided with a plurality of slits 61 extending along the X axis. Meanwhile, the support portion 47 is provided with a plurality of pins 62 to be fitted into the respective slits 61. The pins 62 are movable along the slits 61. Consequently, the slide portion 58 is movable along the X axis with respect to the support portion 47.

The hook 59 extends in a direction orthogonal to the support face 47a of the support portion 47, and projects from the support face 47a. The hook 59 overlaps a guide piece 64 that is provided on the support portion 47 projecting from the support face 47a. The guide piece 64 is larger than a portion of the hook 59 projecting from the support face 47a. The guide piece 64 protects the portion of the hook 59 projecting from the support face 47a.

Figure 9:
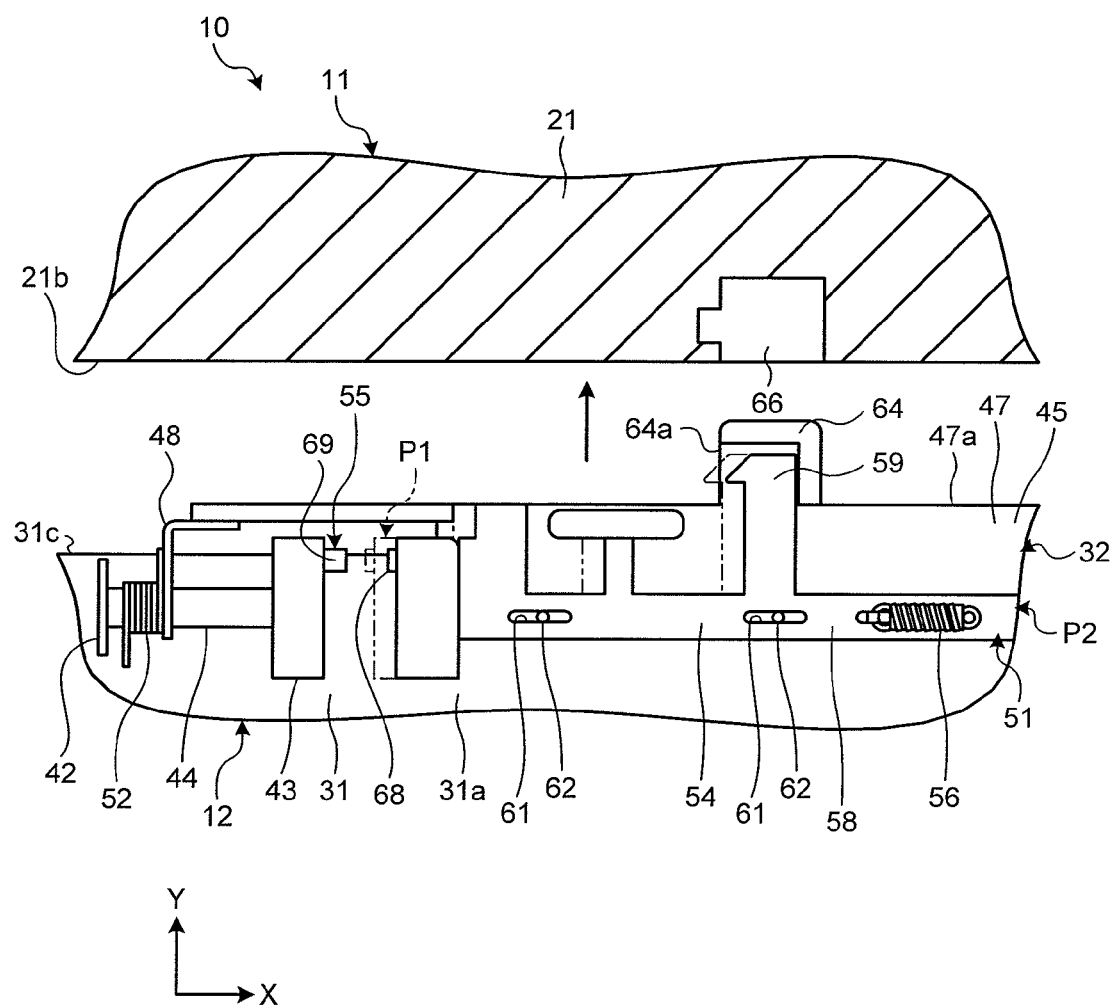
FIG. 9 is an exemplary plan view illustrating a portion of the portable computer in which a combining member is moved in the first embodiment.

FIG. 9 is a plan view schematically illustrating a portion of the opened portable computer 10 in which the combining member 54 is moved. The slide portion 58 movable along the X axis is movable between a combining position P1 indicated by solid lines in FIG. 8 and by dashed-two dot chain lines in FIG. 9 and a separating position P2 indicated by solid lines in FIG. 9.

As illustrated in FIG. 8, when the slide portion 58 is located at the combining position P1, the hook 59 projects from an edge 64a of the guide piece 64. The edge 64a faces to the direction along the X axis. Meanwhile, as illustrated in FIG. 9, when the slide portion 58 is located at the separating position P2, the hook 59 is positioned inside the edge 64a of the guide piece 64.

On the side face 21b of the housing 21 of the tablet 11, an insertion opening 66 is provided. The insertion opening 66 can also be referred to as an engaging portion, an opening portion, a recessed portion, or a slit. When the tablet 11 is attached to the docking portion 32, the hook 59 and the guide piece 64 are inserted into the insertion opening 66.

As illustrated in FIG. 8, when the slide portion 58 is located at the combining position P1, the hook 59 catches the housing 21 of the tablet 11 inside the insertion opening 66. In other words, the hook 59 catches the tablet 11 and restricts the tablet 11 from separating from the docking portion 32. Thus, the combining portion 51 combines the tablet 11 with the docking portion 32.

As illustrated in FIG. 9, when the slide portion 58 is located at the separating position P2, the hook 59 disengages from the housing 21 of the tablet 11. In other words, the hook 59 releases the tablet 11. Thus, the combining portion 51 separates the docking portion 32 from the tablet 11.

The combining member 54 comprises a first magnet 68. The first magnet 68 is provided on the end portion of the slide portion 58 facing the second fixing piece 43. The first magnet 68 is arranged to avoid the axis extending from the rotating shaft 44. Consequently, the first magnet 68 rotates around the rotating shaft 44 together with the rotating portion 45 when the rotating portion 45 rotates.

The second moving portion 55 comprises a second magnet 69. While the first magnet 68 and the second magnet 69 are permanent magnets, they may be other magnets such as electromagnets. The second magnet 69 is arranged on the second fixing piece 43. In other words, the second magnet 69 is fixed with respect to the base 31.

Figure 10:
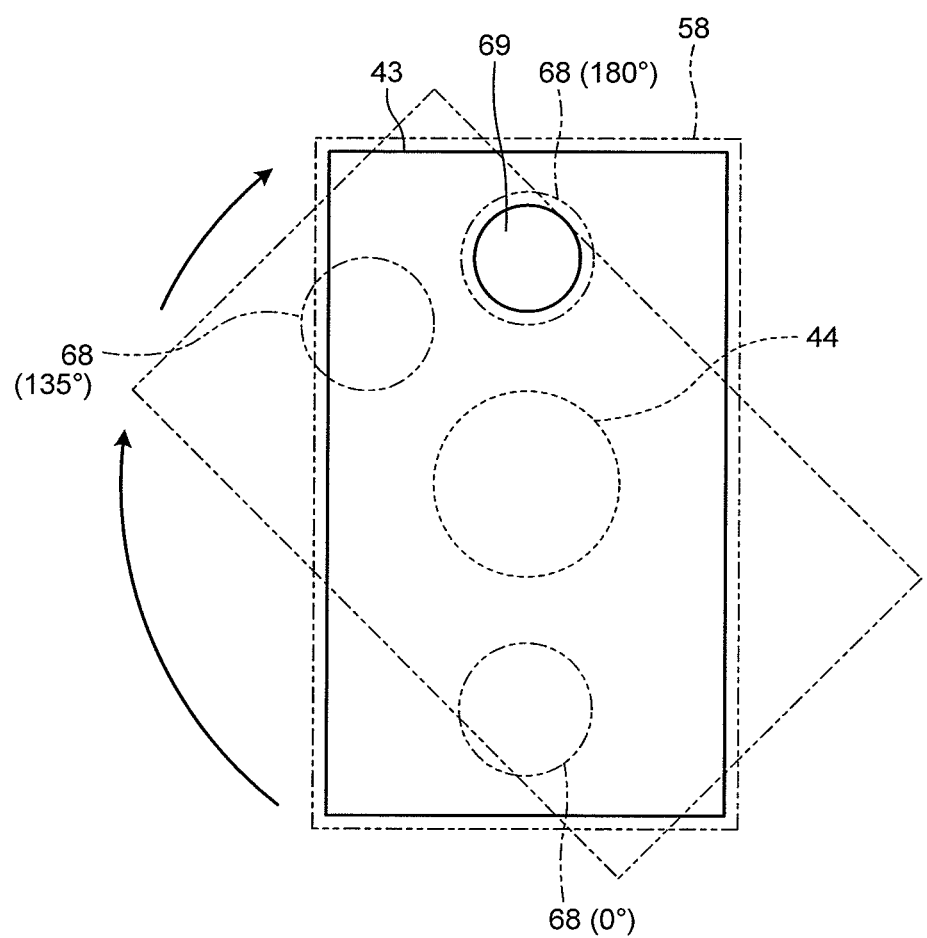
FIG. 10 is an exemplary diagram illustrating a first magnet and a second magnet in the first embodiment.

FIG. 10 schematically illustrates the first and second magnets 68 and 69. The first magnet 68 and the end portion of the slide portion 58 that are indicated by dashed-two dot chain lines in FIG. 10 rotate around the rotating shaft 44 indicated by a broken line. FIG. 10 illustrates the first magnet 68 and the end portion of the slide portion 58 when the docking portion 32 is located at zero degrees, 135 degrees, and 180 degrees with respect to the base 31.

The second magnet 69 faces the first magnet 68 (180°) when the docking portion 32 is located at the position of 180 degrees with respect to the base 31. The position of 180 degrees is one example of the second position as in the foregoing, and is one example of the third position. Thus, the third position may be the same as the second position. The third position in which the first and second magnets 68 and 69 face each other is not restricted to this, and may be another position located between the first position (zero degrees) and the second position (180 degrees).

When the docking portion 32 is located at 180 degrees, the same poles of the first and second magnets 68 and 69 face each other. For example, the S pole of the second magnet 69 faces the S pole of the first magnet 68. Consequently, the second magnet 69 repels the first magnet 68 to move the slide portion 58 to which the first magnet 68 is attached. The second magnet 69 moves the slide portion 58 from the combining position P1 to the separating position P2.

When the docking portion 32 is located at another angle except 180 degrees (for example, at zero degrees as the first position), the first and second magnets 68 and 69 are separate and not facing each other. Consequently, when the docking portion 32 is located at zero degrees, for example, the repulsive force between the first and second magnets 68 and 69 disappears or diminishes.

As illustrated in FIG. 8, the third moving portion 56 is a tension spring, for example. One end portion of the third moving portion 56 is fixed to the slide portion 58. The other end portion of the third moving portion 56 is fixed to the pin 62 fitted into the slit 61. In other words, the other end portion of the third moving portion 56 is fixed to the support portion 47.

The third moving portion 56 applies a force to move toward the combining position 81 to the slide portion 58. In other words, the slide portion 58 of the combining member 54 is pulled toward the combining position P1 at all times by the third moving portion 56. Consequently, the slide portion 58 is configured to be positioned at the combining position 81 when no other external force is exerted.

As illustrated in FIG. 9, when the repulsive force arises between the first and second magnets 68 and 69, the slide portion 58 is pushed by the repulsive force and is moved to the separating position P2. Thus, the repulsive force that arises between the first and second magnets 68 and 69 is stronger than the tensile force of the third moving portion 56. For example, when the docking portion 32 rotates toward zero degrees to eliminate the repulsive force between the first and second magnets 68 and 69, the slide portion 58 moves to the combining position P1 by the tensile force of the third moving portion 56.

The first moving portion 52 is a torsion spring, for example. The first moving portion 52 is attached to the rotating shaft 44. One end of the first moving portion 52 is fixed to the attaching piece 48 of the rotating portion 45. The other end portion of the first moving portion 52 is brought into contact with the base 31 when the docking portion 32 is positioned between 155 and 180 degrees, for example, with respect to the base 31.

When the docking portion 32 is positioned between 155 degrees and 180 degrees with respect to the base 31, the first moving portion 52 is twisted. The first moving portion 52 twisted exerts a force to rotate on the rotating portion 45, to which the one end portion of the first moving portion 52 is fixed, with respect to the base 31 on which the other end portion of the first moving portion 52 abuts.

Figure 11:
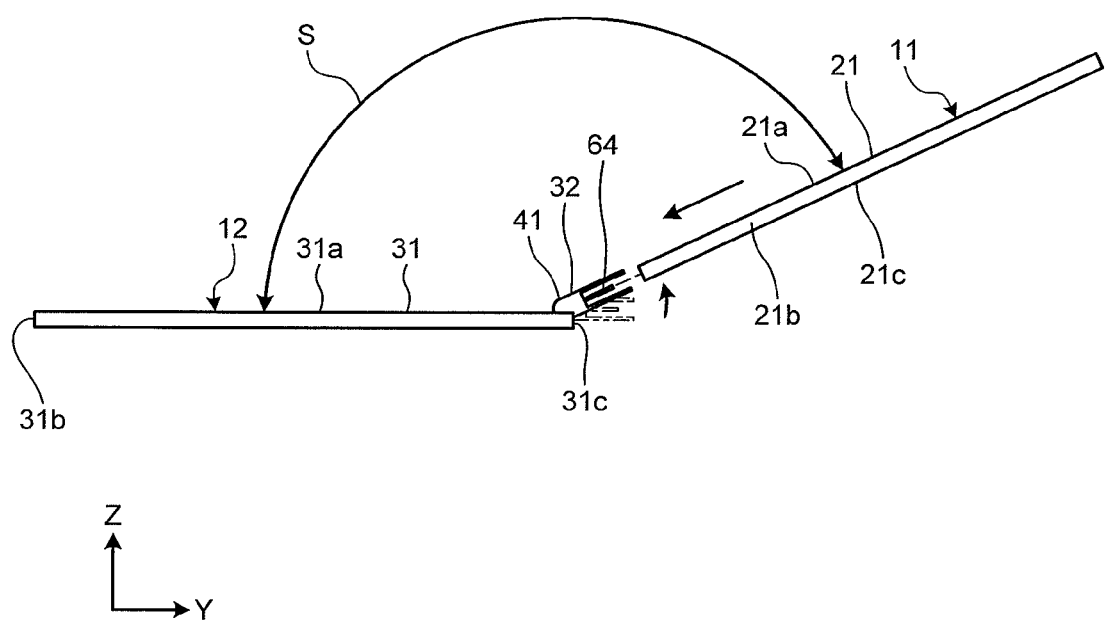
FIG. 11 is an exemplary side view illustrating the portable computer in which a docking portion returns in the first embodiment.

FIG. 11 is a side view schematically illustrating the portable computer 10 in which the docking portion 32 returns. As illustrated in FIG. 11, when the docking portion 32 is located at 180 degrees, for example, the first moving portion 52 exerts a force to rotate on the rotating portion 45 of the docking portion 32. The first moving portion 52 rotates the docking portion 32 positioned between 155 and 180 degrees toward 155 degrees.

An interval S from zero degrees to 155 degrees indicated in FIG. 11 is one example of the combining interval. The combining interval is not restricted to this. It is noted that, even in the interval between 155 degrees and 180 degrees that is outside the interval S, the tablet 11 is attached with the docking portion 32.

Hereinafter, one example of a method of detaching the tablet 11 from the docking portion 32 is described. The method of detaching the tablet 11 from the docking portion 32, however, is not restricted to the method described below.

As illustrated in FIG. 4, the tablet 11 is attached to the docking portion 32. At this time, as illustrated in FIG. 8, the hook 59 of the combining member 54 catches the housing 21 of the tablet 11.

First, the tablet 11 attached to the docking portion 32 is rotated from zero degrees (the first position) illustrated in FIG. 5 toward 180 degrees (the third position) as illustrated in FIGS. 2 and 7. In other words, the portable computer 10 is opened. It is noted that, the docking portion 32 may be at an angle other than zero degrees at first. For instance, as illustrated in FIG. 2, the docking portion 32 located at 135 degrees, for example, may be rotated toward 180 degrees.

The user rotates the tablet 11 and the docking portion 32 by grasping the tablet 11, for example. Because the base 31 is heavier than the tablet 11, the base 31 is not likely to rotate with the tablet 11. Thus, the user can easily rotate the tablet 11 and the docking portion 32 without the user holding the base 31.

When the tablet 11 and the docking portion 32 rotate to 180 degrees, as illustrated in FIG. 9, the first magnet 68 and the second magnet 69 face each other. By the repulsive force that arises between the first and second magnets 68 and 69, the slide portion 58 of the combining member 54 moves from the combining position P1 to the separating position P2. In other words, when the docking portion 32 is located at the position of 180 degrees (the third position), the second moving portion 55 moves the combining member 54 from the combining position P1 to the separating position P2.

When the combining member 54 is located at the separating position P2, the hook 59 disengages from the housing 21 of the tablet 11. In other words, the tablet 11 separates from the docking portion 32. Consequently, the tablet 11 is detached from the docking portion 32 by the user pulling out the tablet 11, for example.

When the tablet 11 is detached from the docking portion 32, the external force exerted on the docking portion 32 disappears. Consequently, as illustrated in FIG. 11, the first moving portion 52 rotates the docking portion 32 from 180 degrees to 155 degrees.

When the docking portion 32 is made to rotate from 180 degrees toward 155 degrees by the first moving portion 52, the first magnet 68 separates from the second magnet 69 and the repulsive force between the first and second magnets 68 and 69 disappears. Consequently, the third moving portion 56 moves the slide portion 58 from the separating position P2 to the combining position P1. In other words, while the docking portion 32 is rotated toward 155 degrees by the first moving portion 52, the third moving portion 56 moves the combining member 54 from the separating position P2 to the combining position P1.

When the docking portion 32 returns to the position of 155 degrees (the interval S), the force of the first moving portion 52 to rotate the docking portion 32 disappears. Consequently, the docking portion 32 stops at the position of 155 degrees.

When attaching the tablet 11 to the docking portion 32 again, as indicated by the arrow in FIG. 11, the tablet 11 is pressed into the docking portion 32. At this time, the hook 59 and the guide piece 64 are inserted into the insertion opening 66 of the tablet 11.

Because the combining member 54 is located at the combining position P1, the hook 59 projects from the edge 64a of the guide piece 64. The hook 59 is thus pushed by the housing 21 of the tablet 11. Consequently, the slide portion 58 temporarily moves from the combining position P1 to the separating position P2.

When the guide piece 64 is inserted into the insertion opening 66 and the tablet 11 is brought into contact with the support face 47a of the support portion 47, the force of the housing 21 of the tablet 11 to push the hook 59 disappears. Consequently, the third moving portion 56 returns the slide portion 58 from the separating position P2 to the combining position P1. The hook 59 that moves together with the slide portion 58 projects from the edge 64a of the guide piece 64, and catches the housing 21 of the tablet 11. Consequently, the tablet 11 is combined with the docking portion 32 again.

In the portable computer 10 according to the first embodiment, by the docking portion 32 being rotated to 180 degrees (the third position), the combining portion 51 separates the tablet 11 from the docking portion 32. Consequently, the tablet 11 is easily separated from the docking portion 32.

Hereinafter, a second embodiment is described with reference to FIGS. 12 to 14. It is noted that, in the following description of a plurality of embodiments, the constituent elements having the same or similar functions as those of the constituent elements that have already been explained are given with the same reference numerals or symbols as those of the already-described constituent elements, and the explanations thereof may further be omitted. Moreover, a plurality of constituent elements given with the same reference numerals or symbols may not share all of the functions and characteristics in common, and may have different functions and characteristics in accordance with each of the embodiments.

Figure 12:
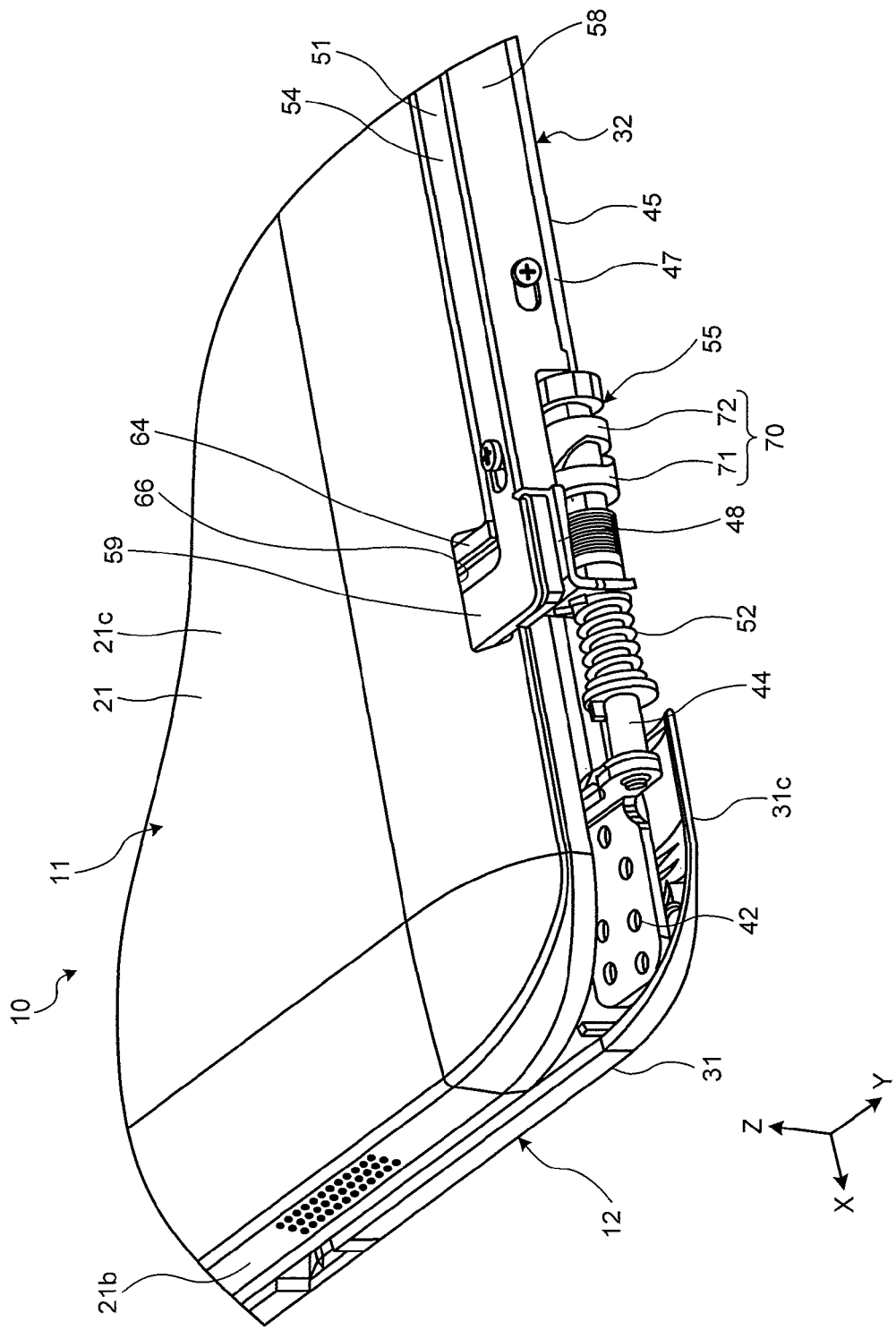
FIG. 12 is an exemplary perspective view illustrating a portion of a portable computer according to a second embodiment.
Figure 13:
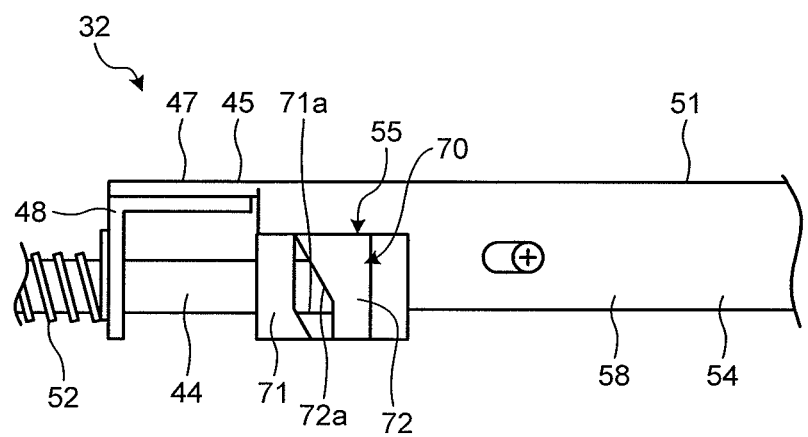
FIG. 13 is an exemplary diagram illustrating a portion of a rotating shaft and a combining portion in the second embodiment.

FIG. 12 is a perspective view illustrating a portion of the portable computer 10 according to the second embodiment around the rear end 31c of the base 31. FIG. 13 schematically illustrates a portion of the rotating shaft 44 and the combining portion 51 in a state in which the docking portion 32 is located between the first position (for example, zero degrees) and the third position (for example, 165 degrees). FIG. 14 schematically illustrates a portion of the rotating shaft 44 and the combining portion 51 in a state in which the docking portion 32 is located between the third position and the second position (for example, 180 degrees).

As illustrated in FIG. 12, the second moving portion 55 in the second embodiment comprises a cam 70. The cam 70 comprises a first cam member 71 and a second cam member 72. The first and second cam members 71 and 72 can also be referred to as a first portion and a second portion, respectively, for example.

The first cam member 71 is fixed to the rotating shaft 44. In other words, the first cam member 71 is fixed with respect to the base 31. As illustrated in FIG. 13, the first cam member 71 comprises a first cam face 71a that is formed in a spiral manner with respect to the rotating shaft 44.

The second cam member 72 is fixed to the slide portion 58 of the combining member 54. The second cam member 72 is positioned on the same axis as the first cam member 71. The second cam member 72 comprises a second cam face 72a that is formed in a spiral manner with respect to the rotating shaft 44 and faces the first cam face 71a.

Figure 14:
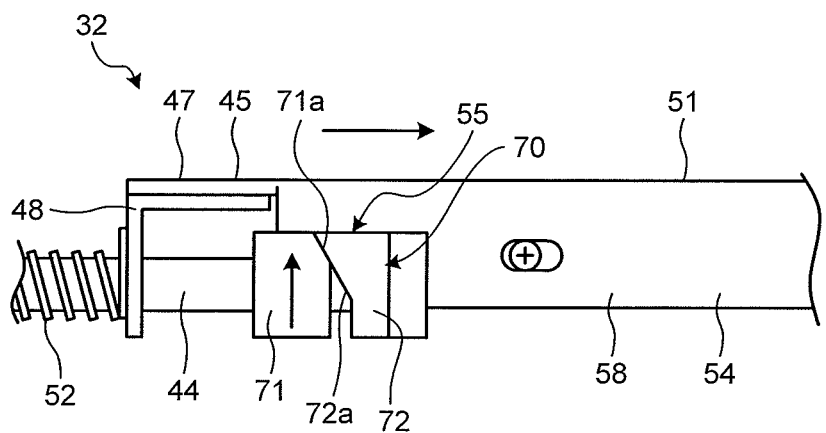
FIG. 14 is an exemplary diagram illustrating a portion of the rotating shaft and the combining portion in which a docking portion is rotated in the second embodiment.

As illustrated in FIG. 14, by the docking portion 32 rotating from zero degrees (the first position) toward 165 degrees (the third position), the second cam face 72a of the second cam member 72 contacts the first cam face 71a of the first cam member 71. While the docking portion 32 further rotates toward 165 degrees, the first cam member 71 pushes the second cam member 72. In other words, the first cam member 71 pushes the combining member 54 via the second cam member 72. Consequently, the combining member 54 to which the second cam member 72 is attached moves from the combining position P1 toward the separating position P2. When the docking portion 32 reaches the position of 165 degrees (the third position) with respect to the base 31, the combining member 54 is positioned at the separating position P2.

When the docking portion 32 rotates from 165 degrees (the third position) toward zero degrees (the first position), the second cam member 72 rotates in reverse. Because the third moving portion 56 pulls the combining member 54, the combining member 54 moves from the separating position P2 to the combining position P1 while the docking portion 32 rotates toward zero degrees.

The second moving portion 55 of the portable computer 10 in the second embodiment comprises the cam 70. This makes it easy to downsize the portable computer 10.

Figure 15:
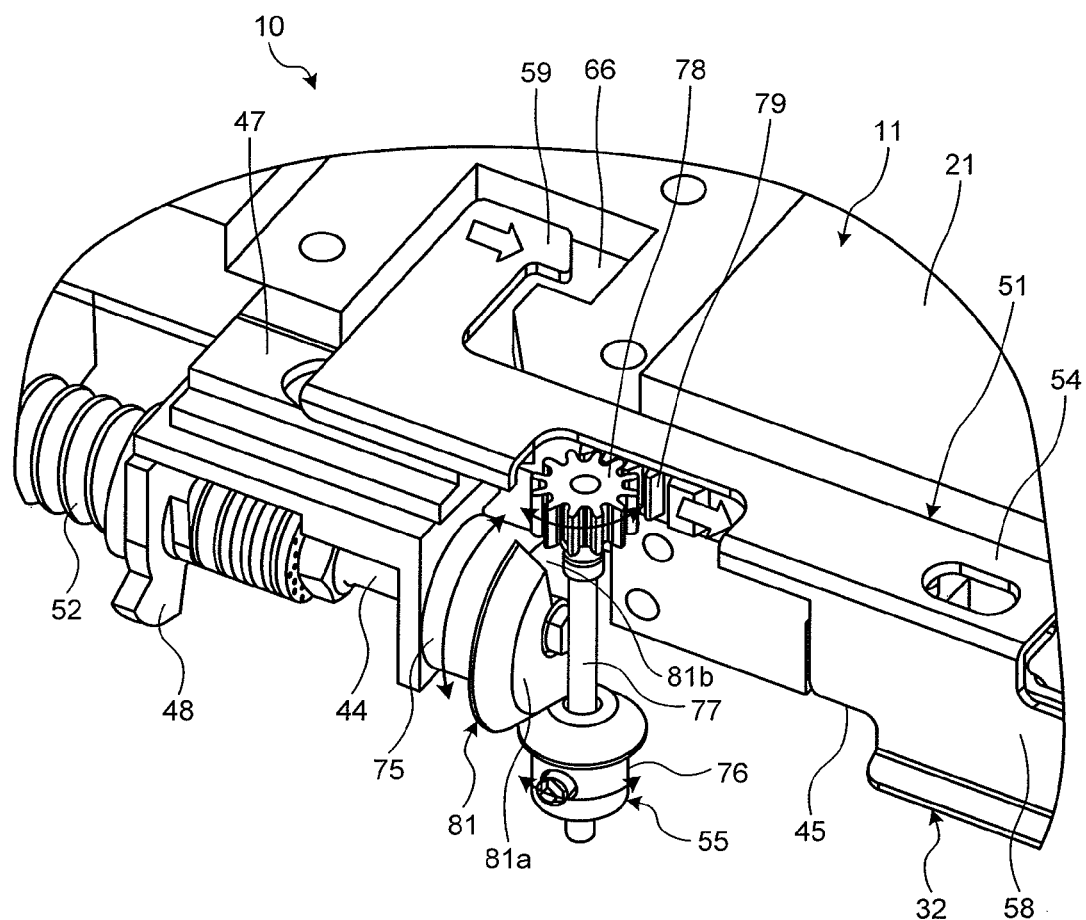
FIG. 15 is an exemplary perspective view illustrating a portion of a portable computer according to a third embodiment.

Hereinafter, a third embodiment is described with reference to FIG. 15. FIG. 15 is a perspective view illustrating a portion of the portable computer 10 according to the third embodiment. As illustrated in FIG. 15, the second moving portion 55 in the third embodiment comprises a first bevel gear 75, a second bevel gear 76, a shaft 77, a pinion 78, and a rack 79. The first and second bevel gears 75 and 76 are examples of a bevel gear. The pinion 78 and the rack 79 are one example of a rack-and-pinion.

The first bevel gear 75 is fixed to the end portion of the rotating shaft 44. In other words, the first bevel gear 75 is fixed with respect to the base 31. The first bevel gear 75 meshes with the second bevel gear 76. The second bevel gear 76 is attached to the rotating portion 45 to be rotatable. In other words, the second bevel gear 76 rotates around the rotating shaft 44 with respect to the first bevel gear 75.

The first bevel gear 75 comprises an engaging portion 81 comprising a plurality of teeth that mesh with the second bevel gear 76. The engaging portion 81 comprises a first area 81a provided with the teeth, and a second area 81b with no teeth. In other words, in the circumferential direction of the first bevel gear 75, the first area 81a that meshes with the second bevel gear 76 and the second area 81b that does not mesh with the second bevel gear 76 are provided.

The first area 81a is provided to extend over 190 degrees in the circumferential direction of the first bevel gear 75. The second area 81b is provided to extend over remaining 170 degrees in the circumferential direction of the first bevel gear 75.

When the docking portion 32 is located at, for example, the first position (for example, zero degrees), the second area 81b of the engaging portion 81 of the first bevel gear 75 faces the second bevel gear 76. Consequently, the first bevel gear 75 and the second bevel gear 76 do not mesh with each other.

When the docking portion 32 rotated reaches a given position (for example, 150 degrees) between the first position and the third position (for example, 180 degrees), the first area 81a of the engaging portion 81 of the first bevel gear 75 faces the second bevel gear 76. Consequently, the first bevel gear 75 and the second bevel gear 76 mesh with each other.

The second bevel gear 76 is connected with the pinion 78 by the shaft 77. Consequently, the pinion 78 rotates in conjunction with the rotation of the second bevel gear 76. In other words, the pinion 78 rotates with respect to the first bevel gear 75. The number of teeth of the second bevel gear 76 per angle is less than the number of teeth of the first bevel gear 75 per angle. Therefore, the angle of rotation of the second bevel gear 76 and the pinion 78, which are in conjunction with the first bevel gear 75, is greater than the angle of rotation of the first bevel gear 75.

The rack 79 is provided on the slide portion 58 of the combining member 54. The rack 79 extends along the X axis. The rack 79 meshes with the pinion 78. Consequently, by the pinion 78 rotating, the slide portion 58 moves along the X axis.

When detaching the tablet 11 in the third embodiment from the docking portion 32, the tablet 11 and the docking portion 32 are rotated from zero degrees (the first position) toward 180 degrees (the third position). When the docking portion 32 reaches 150 degrees, the first bevel gear 75 and the second bevel gear 76 mesh with each other.

When the docking portion 32 is further rotated, the first bevel gear 75 rotates the second bevel gear 76 and the pinion 78. The rotating pinion 78 moves the slide portion 58, on which the rack 79 is provided, from the combining position P1 toward the separating position P2.

When the docking portion 32 reaches the position of 180 degrees (the third position), the slide portion 58 of the combining member 54 reaches the separating position P2. Consequently, the combining portion 51 separates the tablet 11 from the docking portion 32.

When the tablet 11 is detached from the docking portion 32, the first moving portion 52 rotates the docking portion 32 from 180 degrees (the third position) to 145 degrees (the combining interval). During the rotation, the first bevel gear 75 rotates the second bevel gear 76 in reverse. Consequently, the pinion 78 rotates in reverse and moves the slide portion 58, on which the rack 79 is provided, from the separating position P2 to the combining position P1. When the docking portion 32 reaches 150 degrees, the slide portion 58 of the combining member 54 reaches the combining position P1.

When the docking portion 32 is located between zero and 150 degrees, the tablet 11 is attached to the docking portion 32. By the housing 21 of the tablet 11 pushing the hook 59, the rack 79 rotates the pinion 78 and the second bevel gear 76. At this time, because the second bevel gear 76 faces the second area 81b of the engaging portion 81 of the first bevel gear 75, the second bevel gear 76 does not mesh with the first bevel gear 75 and thus rotates freely.

The second moving portion 55 of the portable computer 10 in the third embodiment comprises the first and second bevel gears 75 and 76, the pinion 78, and the rack 79. Consequently, the second moving portion 55 is likely to move the combining member 54 more reliably.

The second moving portion 55 may comprise a variety of components in place of the components described in the first to the third embodiments. For example, the second moving portion 55 may comprise a variety of components configured to move the combining member 54 such as a gear, a belt, a chain, a screw, an elastic body, fluid, and a balloon.

The combining member 54 may comprise a variety of components in place of the hook 59. For example, the combining member 54 may comprise a variety of components configured to attach the tablet 11 to the docking portion 32 such as a magnet, a screw, a suction cup, and a fastener.

The first moving portion 52 may be a variety of components in place of the torsion spring. For example, the first moving portion 52 may be a variety of components configured to rotate the docking portion 32 to a fourth angle such as an elastic body, an air cylinder, fluid, and a balloon.

The third moving portion 56 may be a variety of components in place of the tension spring. For example, the third moving portion 56 may be a variety of components configured to apply a force to move toward the combining position P1 to the combining member 54 such as a compression spring, an elastic body, an air cylinder, fluid, and a balloon.

In accordance with at least one of the embodiments in the foregoing, the combining portion is configured to combine the third part with the second part, and when the second part is positioned at the third part, to separate the third part from the second part. Consequently, the third part can, be easily detached from the second part.

While certain embodiments have been described, these embodiments have been presented byway of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first portion, the second portion, and the third portion are not restricted to the components of the portable computer 10. For instance, the first portion may be a wall, the second portion may be a hinge, and the third portion may be a detachable wall.

The electronic device is not restricted to the portable computer 10. The electronic device may be, for example, a variety of electronic devices such as a personal computer, a tablet type device, a television receiver, a portable game machine, and a car navigation system.

What is claimed is:

1. An electronic device comprising:
a base;
a docker connected to the base and configured to move between a first position and a second position;
an electonic terminal;
a combining portion configured to combine the electronic terminal with the docker when the docker is positioned within a combining interval that is a part of an interval between the first position and the second position, and to separate the electronic terminal from the docker when the docker is positioned at a third position, the third position including the second position and positioning between an end of the combining interval and the second position, the combining portion configured to move between a combining position at which the combining portion is capable of combining the electronic terminal with the docker and a separating position at which the combining portion is capable of separating the electronic terminal from the docker;
a first moving portion configured to apply a force to move the docker positioned at the third position to a position within the combining interval; and
a second moving portion configured to apply a force to move the combining portion from the combining position to the separating position when the docker is positioned at the third position.

2. The electronic device of claim 1, wherein the docker comprises is provided with the combining portion.

3. The electronic device of claim 1, wherein
the combining portion is configured to be positioned at the combining position when the docker is positioned within the combining interval, and
the combining portion is configured to be positioned at the separating position when the docker is positioned at the third position.

4. The electronic device of claim 1, further comprising a third moving portion configured to apply a force to move the combining portion from the separating position to the combining position.

5. The electronic device of claim 1, wherein the second moving portion is configured to move the combining portion from the combining position to the separating position while the docker is moving from the combining interval to the third position.

6. The electronic device of claim 5, wherein the second moving portion comprises a cam configured to push the combining portion.

7. The electronic device of claim 6, wherein
the cam comprises a first cam member fixed to the base and a second cam member fixed to the combining portion, the second cam member configured to be brought into contact with the first cam member, and
the first cam member is configured to move the combining portion by pushing the second cam member while the docker is moving from the combining interval to the third position.

8. The electronic device of claim 5, wherein the second moving portion comprises a bevel gear and a rack-and-pinion configured to move the combining portion by rotating with respect to the bevel gear in accordance with a move of the docker.

9. The electronic device of claim 8, wherein
the bevel gear comprises an engaging portion comprising a plurality of teeth, and
the engaging portion comprises a first area provided with the teeth and a second area with no teeth.

10. The electronic device of claim 1, wherein the second moving portion is configured to move the combining portion from the combining position to the separating position when the docker is positioned at the third position.

11. The electronic device of claim 10, wherein
the combining portion comprises a first magnet, and
the second moving portion comprises a second magnet configured to face the first magnet and to repel the first magnet to move the combining portion when the docker is located at the third position.

12. The electronic device of claim 4, wherein the combining portion comprises a hook configured to engage with the electronic terminal.

13. The electronic device of claim 12, wherein the combining portion is configured to be pushed from the combining position to the separating position by the electronic terminal moving toward a position in which the electronic terminal is combined with the docker when the docker is positioned within the combining interval, and to receive a force to move from the separating position to the combining position by the third moving portion when the electronic terminal is combined with the docker.

14. An combining device comprising:
a base;
a docker connected to the base and configured to move between a first position and a second position;
a electronic terminal;
a combining portion configured to combine the electronic terminal with the docker when the docker is positioned within a combining interval that is a part of an interval between the first position and the second position, and to separate the electronic terminal from the docker when the docker is position at a third position, the third position including the second position and positioning between an end of the combining interval and the second position, the combining portion configured to move between a combining position at which the combining portion is capable of combining the electronic terminal with the docker and a separating position at which the combining portion is capable of separating the electronic terminal from the docker;
a first moving portion configured to apply a force to move the docker positioned at the third position to a position within the combining interval; and
a second moving portion configured to apply a force to move the combining portion from the combining position to the separating position when the docker is positioned at the third position.

* * * * *